June 7, 1966 R. W. McBRIEN 3,254,386
LABORATORY CLAMP STRUCTURE
Filed Feb. 24, 1964
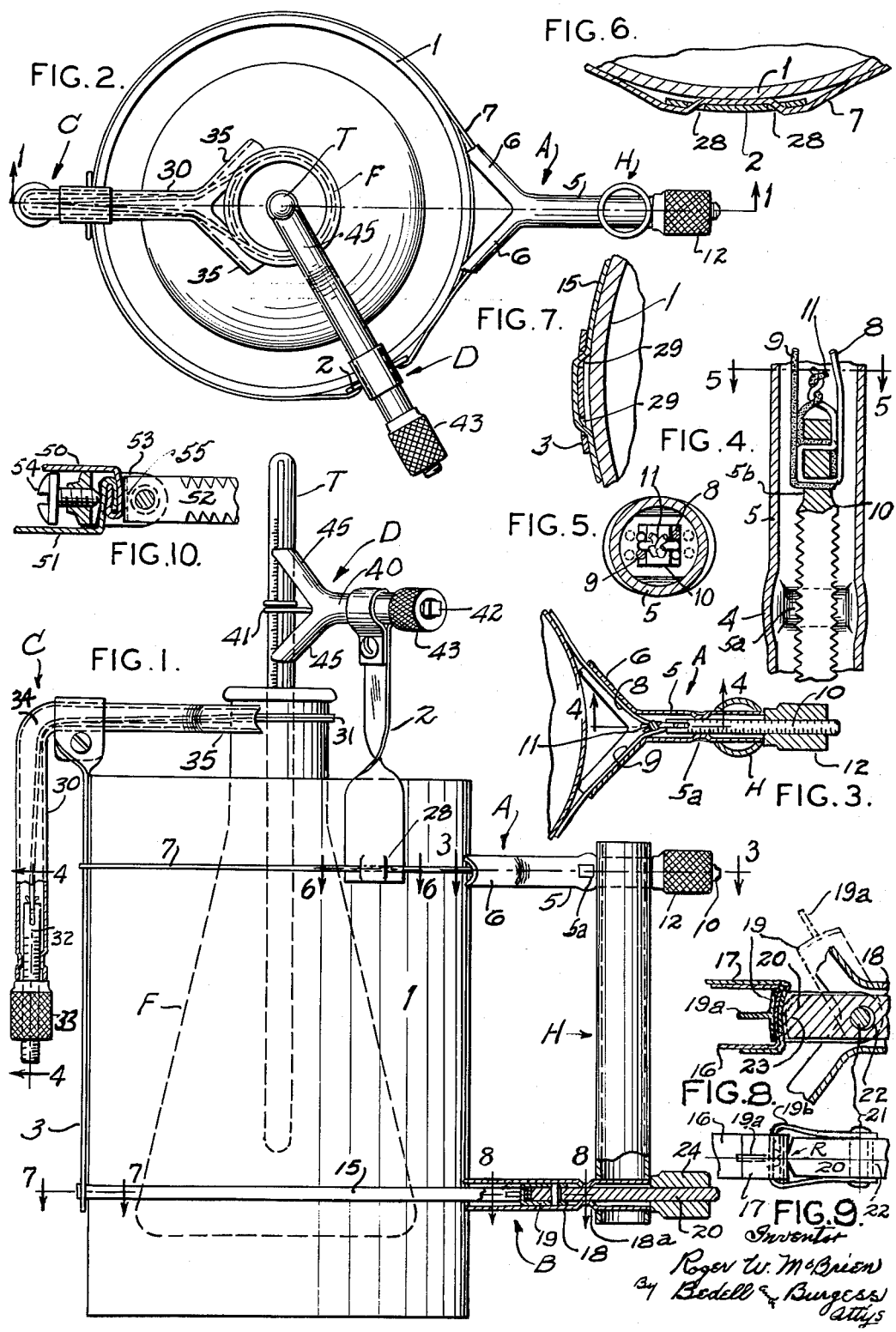

United States Patent Office 3,254,386
Patented June 7, 1966

3,254,386
LABORATORY CLAMP STRUCTURE
Roger W. McBrien, 211 Hi Pointe Place, East Alton, Ill.
Filed Feb. 24, 1964, Ser. No. 346,854
8 Claims. (Cl. 24—278)

The invention relates to clamp structure such as is particularly useful in laboratories for holding beakers, flasks, test tubes and other equipment, although not limited to that field of use. A clamp of this general type is illustrated in Patent 2,914,831 issued to the present applicant.

Among the objects of the present invention are to reduce the cost of such structure, simplify its construction, and make the clamp more versatile for ready applications to different equipment and in various combinations. These and other detail objects are attained by the construction illustrated in the accompanying drawings, in which:

FIG. 1 is a side view of a cylindrical article showing flexible band clamps applied thereto and forming parts of an upright handle and also securing upright standards to the article for mounting additional clamps and equipment supported thereby. Portions of the figure are sectioned on line 1—1 of FIG. 2.

FIG. 2 is a top view of the structure shown in FIG. 1.

FIG. 3 is a detail horizontal section on line 3—3 of FIG. 2 and is drawn to a larger scale.

FIG. 4 is a detail vertical section on line 4—4 of FIG. 1 and is drawn to a larger scale.

FIG. 5 is a detail horizontal section on line 5—5 of FIG. 4.

FIG. 6 is a detail horizontal section on line 6—6 of FIG. 1.

FIG. 7 is a detail horizontal section on line 7—7 of FIG. 1.

FIG. 8 is a detail horizontal section on line 8—8 of FIG. 1.

FIG. 9 is a side view of the parts shown in FIG. 8.

FIG. 10 is a detail section showing an alternate construction for the tie and shank construction of FIG. 4.

FIGS. 1 and 2 show a cylindrical article 1 which could comprise a container, a casing or chimney about a burner, or another apparatus to which clamps A and B are applied to mount an upright handle H and to secured upright supports 2 and 3 to article 1 and these supports in turn mount clamps C and D which carry additional equipment such as a flask F and a thermometer T.

In clamp A an elongated tube 5 is split lengthwise at one end to form forked tongues 6 seated against the side of article 1. A flexible tie 7, preferably of stainless steel, forms a loop substantially surrounding article 1 and having strands 8, 9 at its ends inserted into the split end of tube 5 and there passed back and forth successively through openings spaced apart lengthwise of an elongated shank 10 of squared cross section slidable lengthwise in tube 5. The ends of strands 8, 9 are bent back over the adjacent end of the shank and are twisted together at 11. A nut 12 is threaded on the outer portion of shank 10. When seated against the end of tube 5, nut 12 may be turned to tighten the tie about article 1. Tube 5 is flattened at 5a to oppose opposite flat sides of the shank and prevent the shank from turning in the tube. The bulge 4 in the inner face of the tube opposite the other two flat sides of the shank freely accommodates surplus lengths of the tie strands within the tube.

Clamp B resembles clamp A but a band type flexible tie 15 forms a loop around article 1 and terminates in strands 16, 17 (FIGS. 8, 9) with end portions received in the split forked end of a tube 18, similar to tube 5. The band ends are passed through a stirrup-like latch 19 having a pivot 21 loosely received in a hole 22 through shank 20. The shank end face 23 is curved from each side of the shank to a ridge-like high point R, shown exaggerated in FIG. 9, at the center of the end face so that when latch 19 is swung into alignment, the portions of the flexible bands 16, 17 between the shank end and the cross bar of the latch will be distorted and hence better secured against slippage. The bulged sides 19b of latch 19 provide resilience insuring the frictional grip on the bands between the cross bar and the shank. The user's finger may press against a pin 19a extending outwardly from the cross bar of stirrup 19 to force the latch into the full-line position of FIG. 8.

The upright tubular handle H extends between clamps A and B and is apertured to receive tube 5, 18 which are shouldered at 5a and 18a to form stops abutting handle H. The outer ends of the tubes are substantially flush with or swaged over handle H.

A nut 24 on shank 20 is seated against the ends of tube 18 and functions similarly to nut 12 to draw tie 15 tightly around article 1.

One or more upright mounting members 2, 3 are disposed against the side of article 1 and each has a plurality of slots 28, 29, respectively (FIGS. 6, 7), spaced apart transversely of the member. The ties are laced in and out of the slots. When nuts 12, 24 are screwed inwardly, shanks 10, 20 are drawn outwardly through tubes 5, 18 and members 2, 3 are secured to article 1 and are held in upright position.

Clamp C, supported by upright member 3, comprises a tube 30 and a wire tie 31, a shank 32, and a thrust nut 33, all generally similar to the clamps described above, but tube 30 is bent approximately 90° at 34 so that the upper portion of the tube extends horizontally from the tie loop over the side of article 1 and then extends vertically substantially parallel with the side of article 1. The tie loop surrounds the neck of flask F and the forked legs 35 of the split end of the tube bear against the sides of the flask neck. When nut 33 is tightened the tie is readily drawn taut around the flask neck due to the ability of the wire tie to follow the bend in the tube.

Clamp D, supported by upper member 2, comprises a tube 40 and a wire tie 41 and a shank 42 and a thrust nut 43, generally similar to clamp A. The clamp is supported at a higher level than clamp C and the forked legs 45 of the clamp are disposed in a generally upright plane and bear against the face of thermometer T and support the same with its lower end extending into the lower portion of flask F. Loops 31 and 41 are doubled around the flask neck and the thermometer to provide more secured grips for these small diameter items.

The use of the wire tie as shown in clamps A, C and D permits the loops to be turned selectively to the general plane of the forked legs, as in clamps A and C, or to a different plane disposed at an angle to the plane of the legs, as in clamp D. This increases the adaptability of the clamp for different assemblies.

If the sides of each shank 10, 20 opposite to the bulge in the associated tube are flattened (as best shown at 5b FIG. 4) the passage of the shank, and the overlapping strands of the ties, through the tube will be expedited.

FIG. 10 shows a modified connection between a flat tie and a shank. The tie ends 50, 51 are doubled back and inter-engaged between the end of shank 52 and the cross bar of stirrup 53. A screw 54 is threaded through the cross bar of stirrup 53 and thrusts the overlapped tie ends against the shank to prevent disengagement of the tie ends.

A recess 55 in the end of shank 52 permits the reduced end of screw 54 to distort the folded over ends of the tie strands and thereby increases effectiveness of the attachment.

What is claimed is:

1. In a clamp of the type described, an elongated rigid tube, a clamping tie of elongated flexible material forming a loop adjacent to one end of the tube and having two strands extending from the loop into said tube end, an elongated shank slidable in the tube and projecting from the other end of the tube, the inner end of said shank being within the tube, and the adjacent portion of said shank having a hole extending through said shank transversely of its axis and the end portions of said strands passing through said hole in opposite directions and bent back and projecting beyond said shank end and twisted together, and a nut threaded on the opposite end of the shank and having a thrust bearing on the adjacent end of the tube and contracting the loop when screwed toward the tube.

2. A clamp according to claim 1 in which there are at least two holes extending through the shank transversely of its axis and spaced apart lengthwise of the shank and each strand passes through both holes successively before being bent back to project beyond the end of the shank and be twisted together with the other strand.

3. A clamp according to claim 1 in which the tube is of round cross section and the shank is of square cross section and the strands are positioned between the inner wall of the tube and two opposite flat sides of the shank, and the tube wall opposite the other two flat sides of the shank is flattened to prevent rotation of the shank in the tube.

4. In combination with an open top container, a clamp comprising a rigid elongated tube, disposed substantially perpendicular to the side of the container, and a clamping tie of elongated flexible material forming a loop about the container, said loop having strands at its ends received in said tube end portion, a shank slidable in said tube and having an end therein to which said loop ends are attached and having an opposite end projecting outwardly from the other end of the tube, a takeup nut threaded on the outwardly projecting end portion of the shank end bearing against the latter-mentioned end of the tube, and an elongated upright mounting member applied to the outer side of the container and extending above the top thereof and provided with slots spaced apart transversely of the length of the member, said tie passing through said slots and along one side of said member between said slots and along the other side of said member beyond said slots, whereby said tie, when tightened, may draw the mounting member against the exterior surface of the container.

5. A combination as described in claim 4 which includes a horizontal elongated clamp device carried by the upper end of the mounting member and extending inwardly over the interior of the container and outwardly beyond the side of the container.

6. A combination as described in claim 4 which includes a plurality of upright mounting members spaced apart along the tie loop and drawn against the exterior surface of the container when the tie is tightened and extending to different heights above the top of the container.

7. A combination as described in claim 6 which includes individual horizontally elongated clamp devices carried by the upper ends of the mounting members, the inner ends of the clamp devices being positioned substantially one above the other.

8. In combination with an upright cylindrical article, a pair of clamps at different levels each comprising an elongated tube extending outwardly from the article, and a flexible loop enclosing the article and having strands received in the end of the tube, there being a shank slidable in each tube and having an end secured to said strands, the other end of the shank projecting from the tube and provided with a nut threaded thereon, there being an upright handle member seated against the outer ends of the tubes and apertured transversely for the passage therethrough of the outer end portions of said shanks, and thrust nuts threaded on the latter-mentioned shank end portions and seated against a side of said handle and, when screwed toward the article, clamping the handle to the outer ends of the tubes and tightening the loops about the article.

References Cited by the Examiner

UNITED STATES PATENTS

| | | | |
|---|---|---|---|
| 422,676 | 3/1890 | Willard | 248—94 X |
| 567,157 | 9/1896 | Noyes. | |
| 1,553,891 | 9/1925 | Cloud | 138—99 X |
| 2,526,055 | 10/1950 | Webb | 24—278 |
| 2,693,015 | 11/1954 | Richards et al. | 24—243 |
| 2,914,831 | 12/1959 | McBrien | 24—243 |
| 3,061,339 | 10/1962 | Jewell | 24—278 X |
| 3,105,714 | 10/1963 | Kimber | 24—278 X |
| 3,129,994 | 4/1964 | Harmon et al. | 24—278 X |

FOREIGN PATENTS 20,122    1916    Great Britain.

WILLIAM FELDMAN, *Primary Examiner.*

DONLEY J. STOCKING, *Examiner.*

D. GRIFFIN, *Assistant Examiner.*